United States Patent
Ohira et al.

(10) Patent No.: US 9,014,484 B2
(45) Date of Patent: Apr. 21, 2015

(54) APPLIANCE CONTROL APPARATUS, METHOD THEREOF AND PROGRAM THEREFOR

(71) Applicants: Hidetaka Ohira, Tokyo (JP); Masashi Nishiyama, Kanagawa (JP); Yasunobu Yamauchi, Kanagawa (JP)

(72) Inventors: Hidetaka Ohira, Tokyo (JP); Masashi Nishiyama, Kanagawa (JP); Yasunobu Yamauchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 151 days.

(21) Appl. No.: 13/676,640

(22) Filed: Nov. 14, 2012

(65) Prior Publication Data

US 2013/0195367 A1 Aug. 1, 2013

(30) Foreign Application Priority Data

Nov. 14, 2011 (JP) ................................. 2011-248913

(51) Int. Cl.
*G06K 9/52* (2006.01)
*G06K 9/00* (2006.01)
*G06K 9/22* (2006.01)
*G06K 9/46* (2006.01)
*H04M 1/725* (2006.01)

(52) U.S. Cl.
CPC ............ *G06K 9/00523* (2013.01); *G06K 9/228* (2013.01); *G06K 9/4647* (2013.01); *H04M 1/72533* (2013.01); *H04M 2250/52* (2013.01)

(58) Field of Classification Search
USPC .......... 382/103, 206, 209, 219, 278; 348/161, 348/211.99, 211.4, 211.8
See application file for complete search history.

(56) References Cited

U.S. PATENT DOCUMENTS

| | | | | |
|---|---|---|---|---|
| 5,491,529 A * | 2/1996 | Iwai et al. | ........................ | 396/59 |
| 6,226,933 B1 * | 5/2001 | Nelson et al. | ................... | 52/101 |
| 6,519,901 B1 * | 2/2003 | Nelson et al. | ................... | 52/101 |
| 8,066,572 B1 * | 11/2011 | Timmons et al. | ............... | 463/42 |
| 8,079,055 B2 * | 12/2011 | Hardacker et al. | ............ | 725/113 |
| 8,234,672 B2 * | 7/2012 | Morse et al. | .................... | 725/49 |
| 8,253,796 B2 * | 8/2012 | Renkis | .......................... | 348/143 |
| 8,285,560 B2 * | 10/2012 | Gopinathan et al. | ............. | 705/2 |
| 8,312,660 B1 * | 11/2012 | Fujisaki | ....................... | 42/70.11 |
| 8,316,237 B1 * | 11/2012 | Felsher et al. | ................ | 713/171 |
| 8,407,751 B2 * | 3/2013 | Weaver | ......................... | 725/109 |
| 8,600,830 B2 * | 12/2013 | Hoffberg | ..................... | 705/26.3 |

(Continued)

FOREIGN PATENT DOCUMENTS

| | | |
|---|---|---|
| JP | 2007-235613 | 9/2007 |
| JP | 2009-100217 | 5/2009 |

(Continued)

OTHER PUBLICATIONS

Ohira et al., U.S. Appl. No. 13/915,979, filed Jun. 12, 2013—awaiting examination, Jul. 11, 2014.

(Continued)

*Primary Examiner* — Yosef Kassa
(74) *Attorney, Agent, or Firm* — Nixon & Vanderhye, P.C.

(57) ABSTRACT

An appliance control apparatus recognizes image features of an target appliance from an obtained image, calculates a degree of similarity between the image features of the target appliance and image features of a registered appliance, specifies the registered appliance corresponding to the image features in the case where the degree of similarity indicates a high similarity as the target appliance; calls up control information of the specified target appliance, and controls the target appliance.

10 Claims, 13 Drawing Sheets

(56) References Cited

U.S. PATENT DOCUMENTS

| | | |
|---|---|---|
| 8,745,946 B2 * | 6/2014 | D'Alessandro et al. ... 52/506.05 |
| 8,754,946 B2 * | 6/2014 | Renkis .......................... 348/156 |
| 2010/0287511 A1 | 11/2010 | Meier et al. |
| 2012/0154108 A1 * | 6/2012 | Sugaya ......................... 340/5.1 |
| 2012/0290981 A1 | 11/2012 | Uchida |

FOREIGN PATENT DOCUMENTS

| | | |
|---|---|---|
| JP | 2009-206920 | 9/2009 |
| JP | 2010-541053 | 12/2010 |
| JP | 2011-61247 | 3/2011 |
| WO | 2011/086956 | 7/2011 |

OTHER PUBLICATIONS

Office Action mailed Aug. 19, 2014 in counterpart Japanese Patent Application No. 2011-248913 and English-language translation thereof.

* cited by examiner

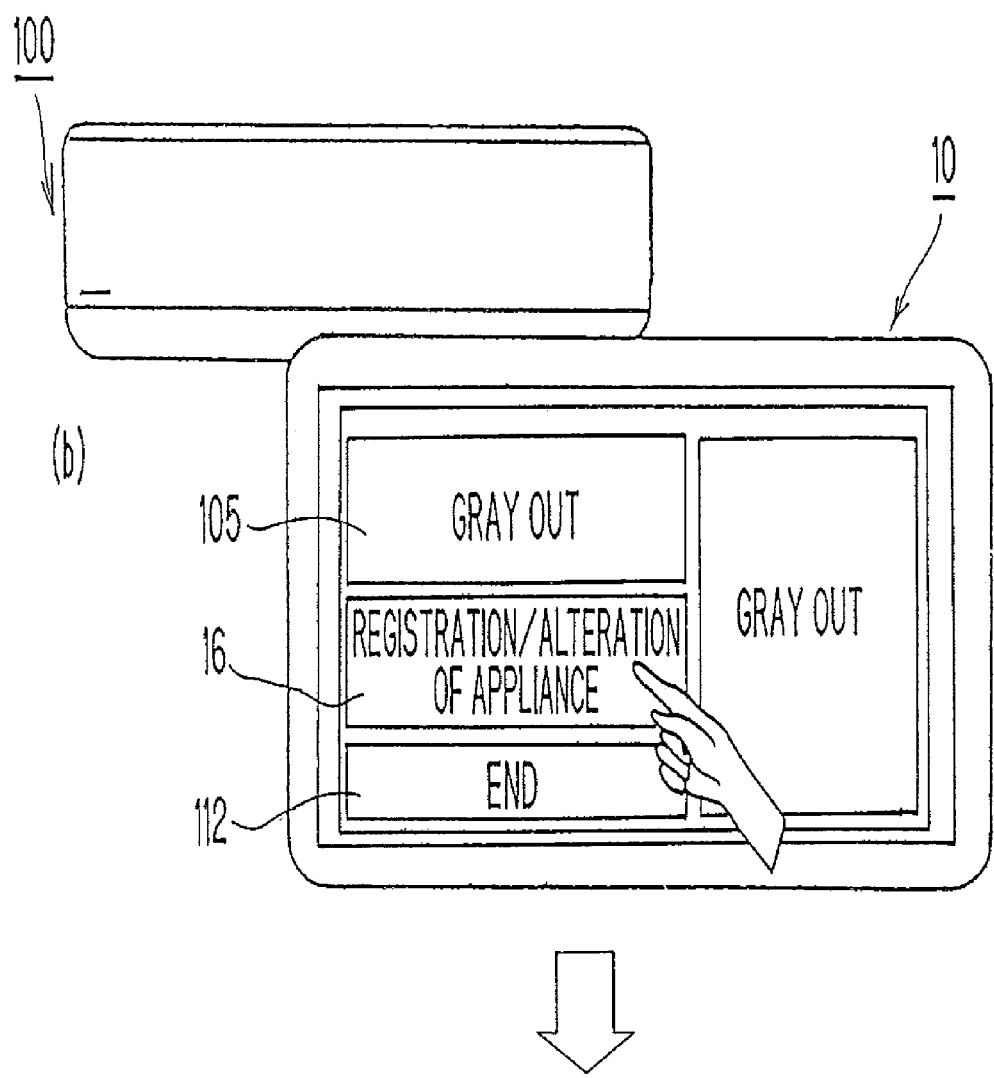

WHEN APPLIANCE IS NOT REGISTERED (NOT DETECTED)

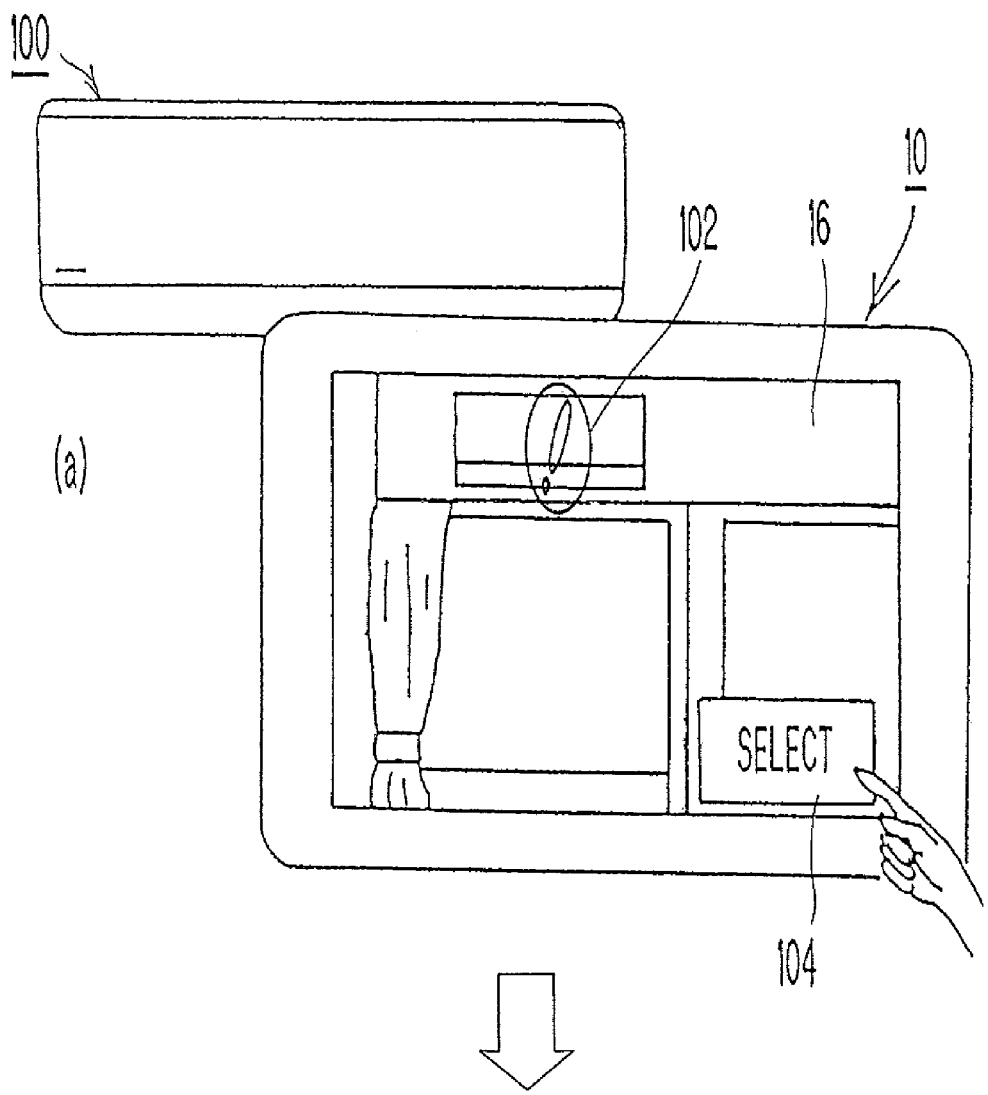

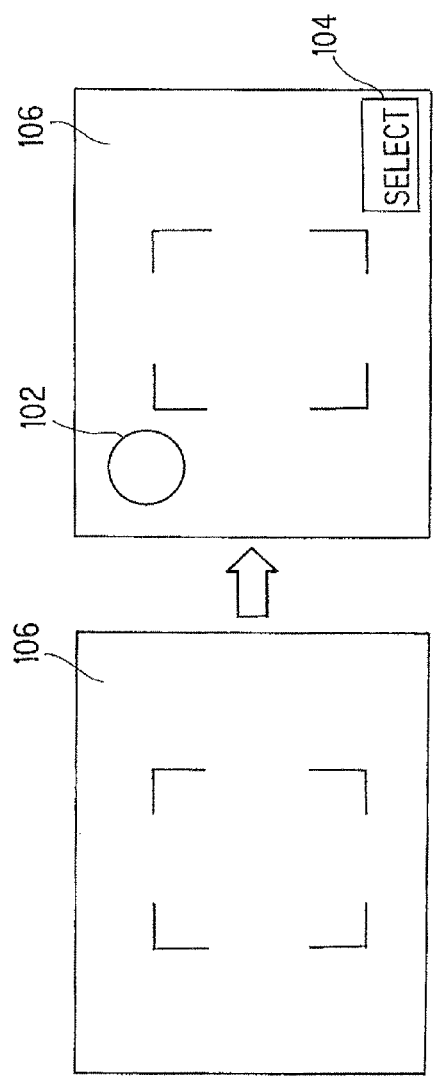
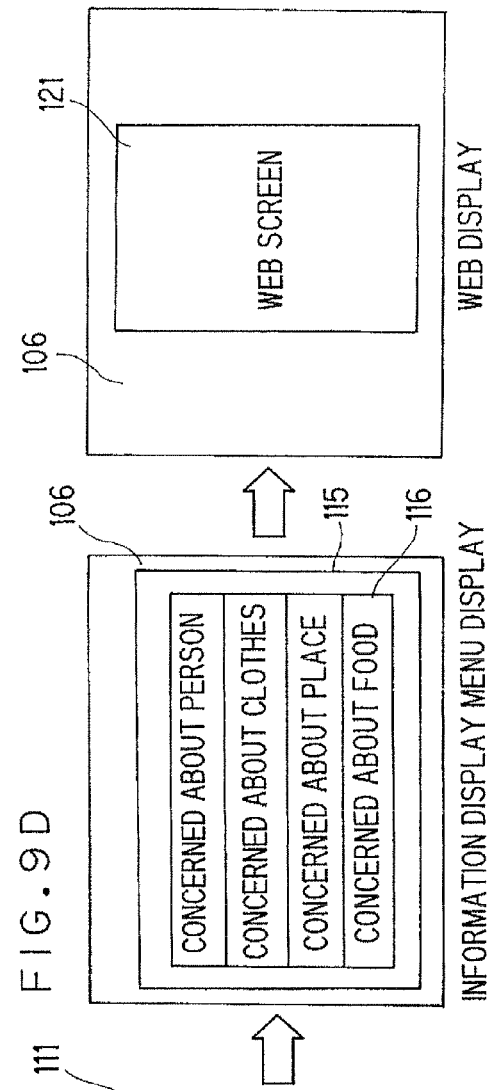

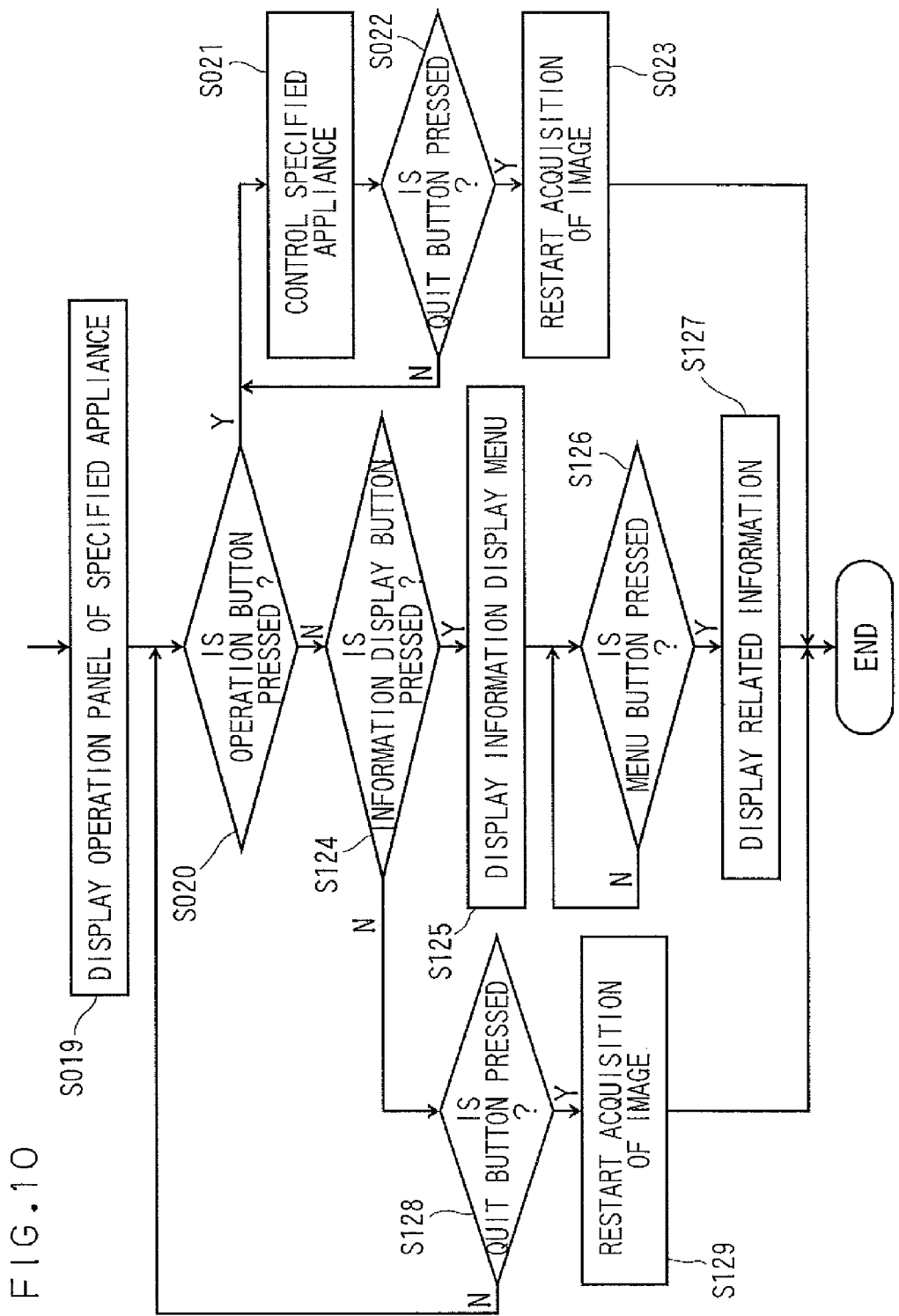

APPLIANCE CONTROL APPARATUS, METHOD THEREOF AND PROGRAM THEREFOR

CROSS-REFERENCE TO RELATED APPLICATIONS

This application is based upon and claims the benefit of priority from the prior Japanese Patent Application No. 2011-248913, filed on Nov. 14, 2011; the entire contents of which are incorporated herein by reference.

FIELD

Embodiments described herein relate generally to an appliance control apparatus, a method thereof and a program therefor.

BACKGROUND

A multi remote controller is widely used as an appliance control apparatus configured to remotely control household electrical appliances such as air conditioning apparatuses, TV sets, and luminaires, or other appliances (hereinafter, referred to as "target appliance"). However, the multi remote controller of the related art requires users to select the target appliance as an object of control from an appliance list, which imposes a significant strain on the users.

Therefore, there is a multi remote controller configured to specify the target appliance that the user wants to control by using information of a beacon emitted from the target appliance.

However, relating to the multi remote controller described above, there is a problem that the accuracy of the beacon from the target appliance is insufficient to discriminate the target appliance and an appliance positioned nearby.

BRIEF DESCRIPTION OF THE DRAWINGS

FIGS. 6A to 6C illustrate explanatory drawings illustrating an target appliance in a register mode;

FIGS. 7A to 7C illustrate explanatory drawings illustrating the target appliance in a control mode;

FIGS. 9A-9E illustrate information display menu according to Embodiment 2; and

FIG. 10 illustrates a flowchart of the appliance control apparatus.

DETAILED DESCRIPTION

Figure 1:
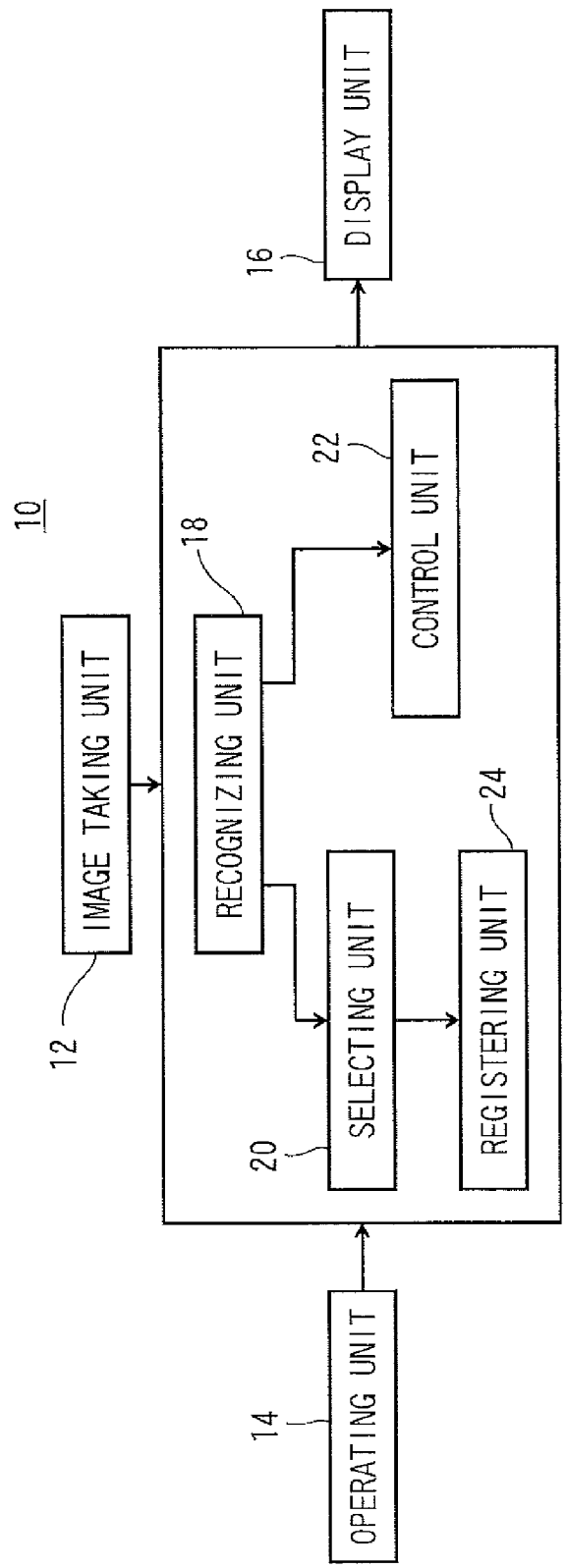
FIG. 1 illustrates a block diagram of an appliance control apparatus according to Embodiment 1.

According to embodiments, there is provided an appliance control apparatus including: a registering unit configured to register identification information, image features, and control information of a registered appliance, which is an appliance to be registered for being controlled, in association with one another; an image acquiring unit configured to acquire an image in which an target appliance, which is an object of control, is imaged; a recognizing unit configured to (1) recognize image features of the target appliance from the image, (2) calculate a degree of similarity between the image features of the target appliance and the image features of the registered appliance, and (3) specify the registered appliance corresponding to the image features in the case where the degree of similarity indicates a high similarity as the target appliance; and a control unit configured to call up the control information of the specified target appliance from the registering unit and control the target appliance.

An appliance control apparatus 10 according to an embodiment will be described with reference to the drawings.

Embodiment 1

Referring now to FIG. 1 to FIG. 8, an appliance control apparatus 10 according to Embodiment 1 will be described.

The appliance control apparatus 10 has two modes; namely a register mode and a control mode for target appliance 100. The "register mode" is a mode for taking an image of an appliance and registering the appliances as the target appliance 100. The "control mode" is a mode for acquiring control information relating to the target appliance 100 included in the image from information registered in advance, and controlling the target appliance 100 based on the control information. The target appliance is an appliance to be controlled. In the drawing, an air conditioning apparatus is exemplified as an example of the target appliance 100 in the description.

A configuration of the appliance control apparatus 10 will be described with reference to FIG. 1. FIG. 1 is a block diagram showing the appliance control apparatus 10.

The appliance control apparatus 10 comprises an image taking unit 12, an operating unit 14, a display unit 16, a recognizing unit 18, a selecting unit 20, a control unit 22, and a registering unit 24. The appliance control apparatus 10 has a form of, for example, a handheld device (for example, a tablet-type handheld terminal, a smart phone or the like) including the display unit 16 such as a liquid crystal panel which displays a moving image to a user, the operating unit 14 as a touch panel provided on the display unit 16, and the image taking unit 12 configured to take the moving image mounted in a single plate-shaped case.

The image taking unit 12 is configured to take an image in time series (a moving image) by using an imaging device such as an image sensor.

The operating unit 14 processes an input of a user at the time of controlling and registering the target appliance 100. The operating unit 14 is, for example, a touch panel provided on the display unit 16 as described above.

The display unit 16 is configured of a liquid crystal panel or the like. The display unit 16 displays an image taken by the image taking unit 12, control information required for registering or controlling the target appliance 100, and a condition of recognition of the target appliance 100.

The recognizing unit 18 recognizes the target appliance 100 such as a TV set, an air conditioning apparatus, and a luminaire existing in the image taken by the image taking unit 12 in the control mode. When the recognizing unit 18 recognizes whether or not the target appliance 100 exists in the image, the recognizing unit 18 extracts image features of the image, calculates a degree of similarity between the extracted image features and image features of an appliance registered in the registering unit 24 in advance (hereinafter, referred to as "registered appliance"), and recognizes the existence of the target appliance 100 by whether or not the degree of similarity is equal to or higher than a threshold value. As a method of extracting the image features, there is a method of extracting the image features from a brightness difference between pixels such as HoG features and SIFT features.

Figure 3:
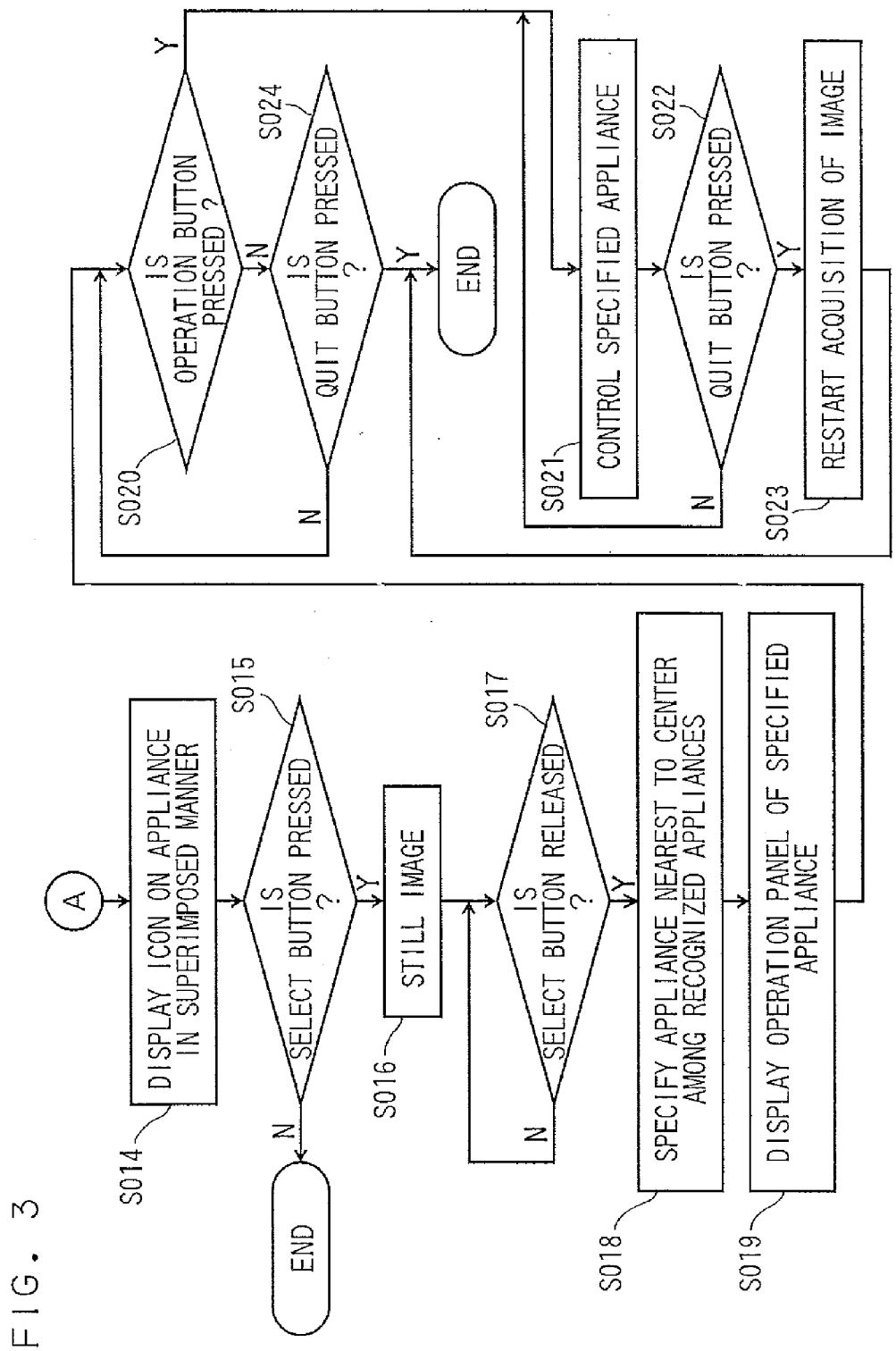
FIG. 3 illustrates a second flowchart of the appliance control apparatus.

However, there is another method of extracting the image features including calculating a total brightness of certain areas of the image and extracting the image features from the brightness difference between the areas as shown in FIG. 3. This extracting method is more robust for a change in vision of the target appliance 100 in comparison with the method of extracting the image features from the brightness difference among the pixels. The image features are extracted from the brightness difference between the areas by, for example, the following method.

Figure 4:
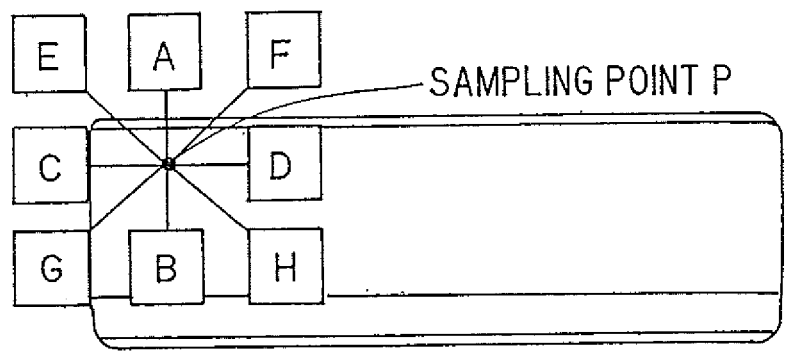
FIG. 4 illustrates a first drawing showing a method of extracting image features of the appliance control apparatus.
Figure 5:
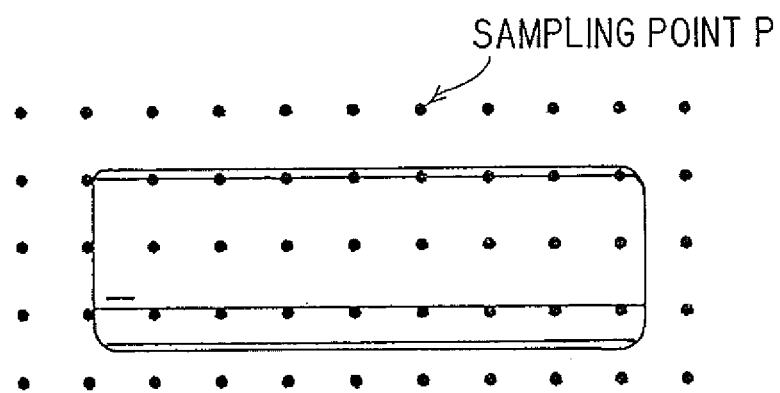
FIG. 5 illustrates a second drawing showing a method of extracting the image features of the appliance control apparatus.

As a first process, the recognizing unit 18 selects a plurality of areas A to H from the periphery of a sampling point P in the image and obtains the total brightness of the respective areas A to H as shown in FIG. 4. Grid sampling as shown in FIG. 5 and an extreme value of DoG (Difference of Gaussian) may be employed for obtaining the sampling points P. The area has a rectangular shape and, for example, an upper area A, a lower area B, a left area C, a right area D, an upper left area E, an upper right area F, a lower left area G, and a lower right area H of the sampling point P are selected. The areas may be set not only on an appliance body, but also on a background of the appliance.

As a second process, the recognizing unit 18 obtains the brightness difference of the sampling point P from the weighted sum of the total brightness of the respective areas A to H. As regards the total weight of the brightness of the respective areas A to H, when obtaining the brightness difference in a y-direction, for example, the upper area A of the sampling point P is set to 2, the lower area B thereof to −2, the left area C thereof to 0, the right area D thereof to 0, the upper left area E thereof to 1, the upper right area F thereof to 1, the lower left area G thereof to −1, and the lower right area H thereof to −1. When obtaining the brightness difference in an x-direction, the upper area A of the sampling point P is set to 0, the lower area B thereof to 0, the left area C thereof to 2, the right area D thereof to −2, the upper left area E thereof to 1, the upper right area F thereof to −1, the lower left area G thereof to 1, and the lower right area H thereof to −1.

As a third process, the recognizing unit 18 determines the directions of brightness of the sampling point P from the brightness difference of the sampling point P. The directions of brightness of the sampling point P may be four directions of upward, downward, leftward and rightward, eight directions with oblique four directions added thereto, or five (nine) directions with no direction (no brightness difference) added thereto. The determination of the directions of brightness of the sampling point P may be performed, for example, by the following assessments.

A first assessment is based on a magnitude relationship between the brightness difference in the x-direction or the brightness difference in the y-direction and zero.

A second assessment is based on the magnitude relationship between the brightness difference in the x-direction and the brightness difference in the y-direction.

A third assessment is based on a magnitude of an absolute value of the brightness difference in the x-direction or the brightness difference in the y-direction.

A fourth assessment is based on a brightness angle obtained between the brightness difference in the x-direction and the brightness difference in the y-direction.

A fifth assessment is based on a combination of the first to fourth assessments.

As a fourth process, the recognizing unit 18 creates one or more histograms in the direction of the brightness difference of the sampling point P. The histogram is created in the following method.

A first method of creation is creating one histogram in the direction of brightness from all the sampling points P.

A second method of creation is dividing the image into certain areas, and creating a plurality of histograms by creating histograms in the direction of brightness from the sampling points P in the respective areas.

As a fifth process, the recognizing unit 18 extracts the created histogram as the image features.

The recognizing unit 18 calculates the degree of similarity between the extracted image features and the image features of the registered appliance registered in the registering unit 24 by using SSD (Sum of Squared Difference), SAD (Sum of Absolute Difference), or a normalization cross-correlation. The higher the degree of similarity between the extracted image features and the image features of the registered appliance, the higher the obtained value becomes.

In order to present the condition of recognition of the target appliance 100 to the user in a easy-to-recognize manner, the recognizing unit 18 displays an icon 102, which is a recognition mark on an image of the display unit 16 over the recognized target appliance 100 when the target appliance 100 is recognized as shown in FIG. 7A.

The recognizing unit 18 takes an image of the appliance which the user wants to register using the image taking unit 12 in the register mode, and extract the image features of the appliance from this image in the same manner as described above.

In the register mode, the selecting unit 20 selects the type of the appliance taken by the image taking unit 12 when registering the corresponding appliance in the taken image in the registering unit 24 as the registered appliance. The type of the registered appliance means identification information of the registered appliance, which is a model number or a production number of the household electrical appliance such as the TV set or the air conditioning apparatus.

Figure 8:
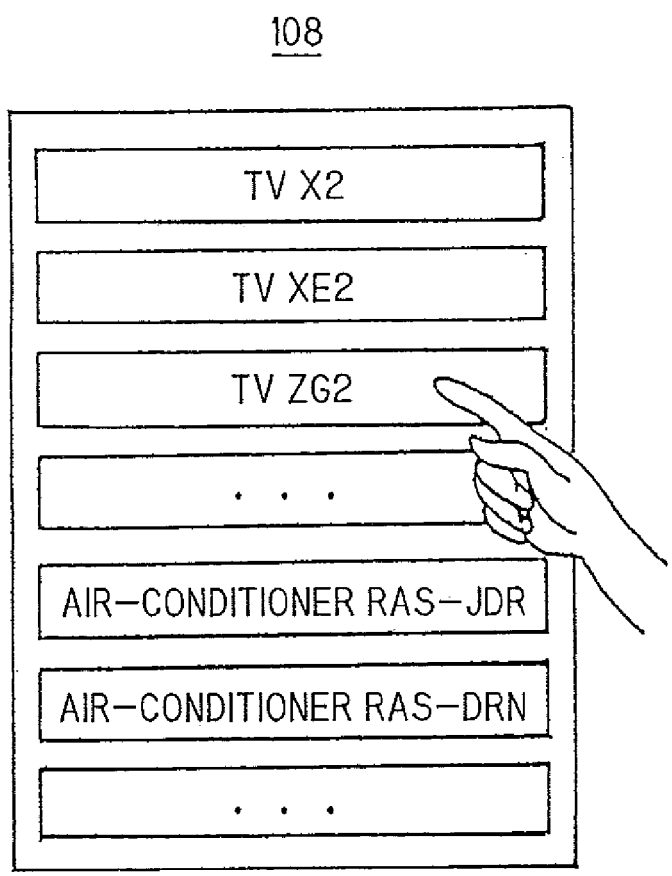
FIG. 8 illustrates an explanatory drawing illustrating a method of selecting the target appliance.

The user selects the appliance in the image taken by the image taking unit 12 from an appliance list as shown in FIG. 8. Information displayed in the appliance list is registered in the appliance control apparatus 10 in advance. In the appliance list, the identification information and the control information of the registered appliances are registered in association with each other. The control information includes, for example, infrared ray or packet details of radio communication required for controlling the corresponding TV set or air conditioning apparatus, or information about a control panel 110 relating to buttons or a slide bar required for the control.

Figure 6A:
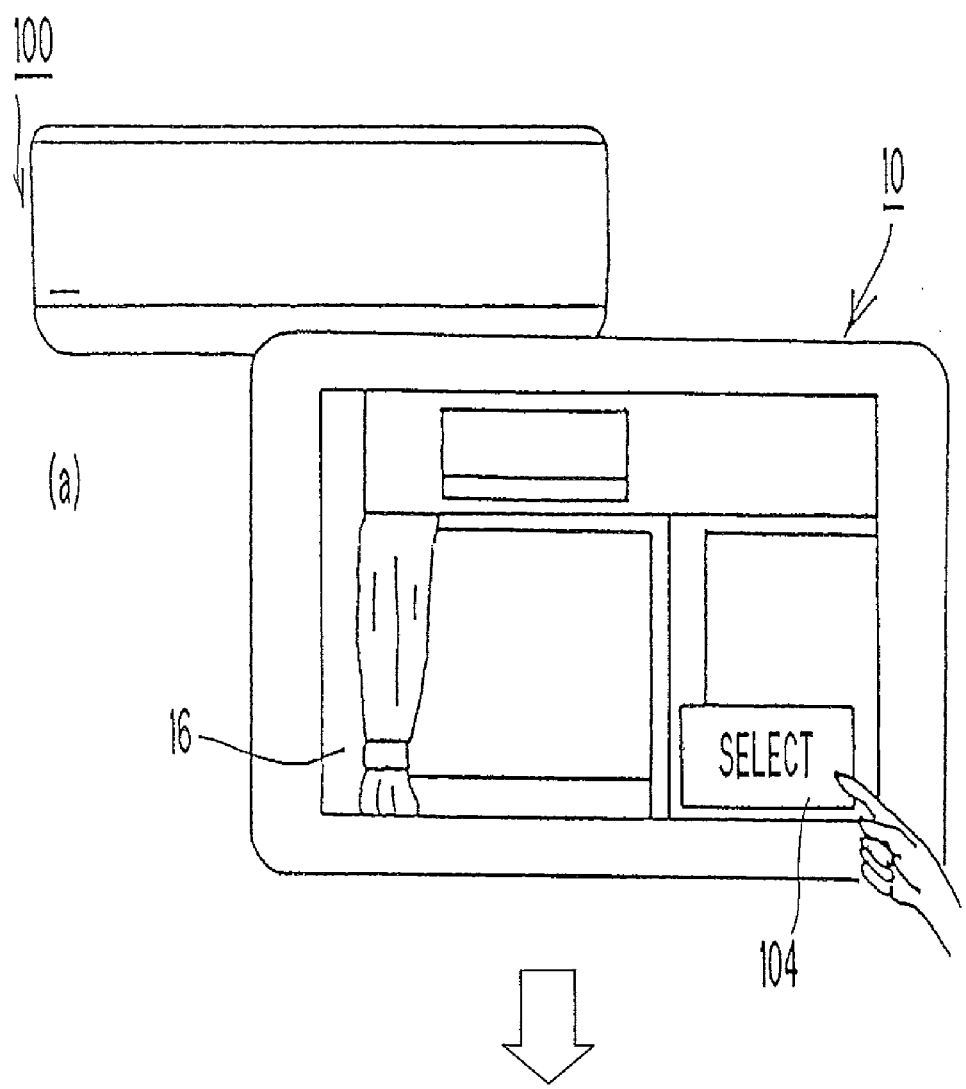
Figure 6C:
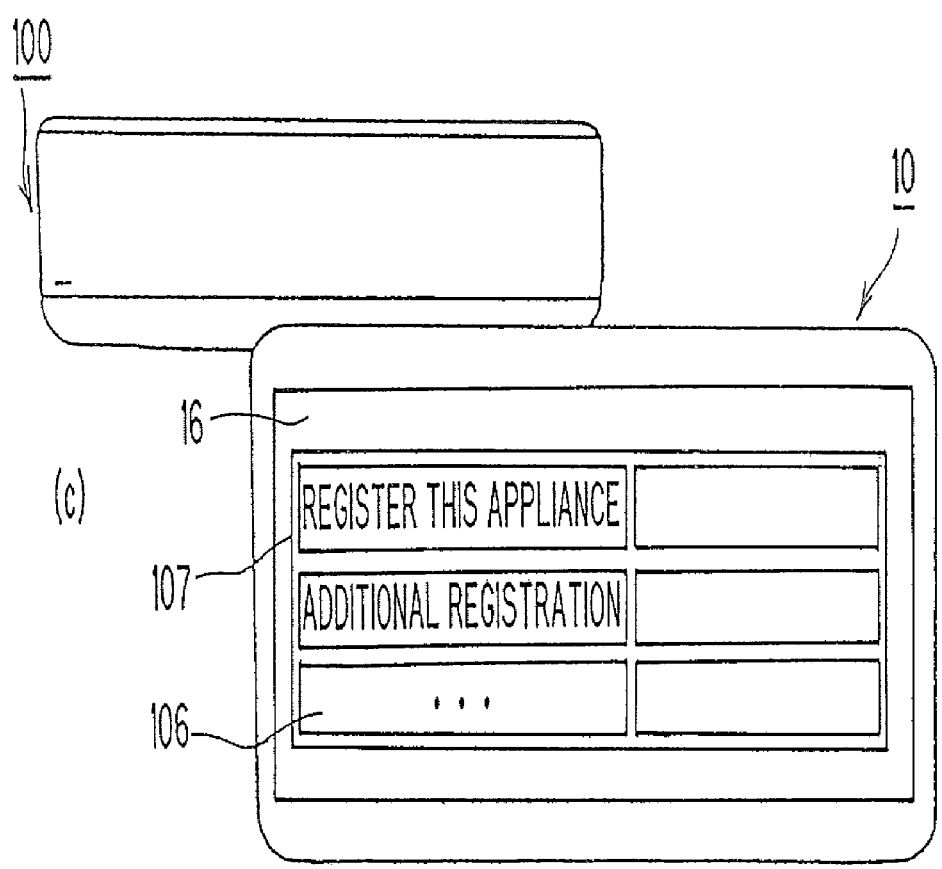

When selecting the appliance, the selecting unit 20 displays a registration panel 106 and a registration button 107 as shown in FIG. 6C in order to present the user the image of the appliances taken by the image taking unit 12 in a easy-to-recognize manner, stops taking the image by the image taking unit 12 temporarily, and continues to display the image of the appliances taken by the image taking unit 12.

The registering unit 24 registers the corresponding appliance as the registered appliance with the image features of the appliance which the user wants to register extracted by the recognizing unit 18 and the type and the control information of the appliance selected by the selecting unit 20 in association with one another.

The registering unit 24 is capable of deleting or altering part or all of the identification information, the image features, and the control information of the registered appliance and, in addition, is capable of newly adding the image features and the control information relating to the registered appliance. In other words, the user performs the alteration or deletion as described above by pressing a registration/alteration button 113 of the control panel 110 shown in FIG. 7B, then pressing a delete button 118 or an alteration button 119 on a registration/alteration panel 117 as shown in FIG. 7C.

The control unit 22 performs a role as the remote controller for controlling the target appliance 100 recognized by the recognizing unit 18. In other words, when a SELECT button 104 is pressed by the user in a state in which the recognizing unit 18 recognizes the target appliance 100 as shown in FIG. 7A, the control panel 110 is displayed, and the control unit 22 calls the control information of the registered appliance corresponding to the target appliance 100 from the registering unit 24 and displays the control panel 110 on the display unit 16, so that the operation corresponding to the control of the operating unit 14 is performed with respect to the target appliance 100.

When a plurality of the appliances to be controlled 100 are displayed on the image, the control unit 22 selects the target appliance 100 located near the center of the image as an object to be controlled. However, the control unit 22 may be configured to display options on the display unit 16 so as to allow the user to select the target appliance 100 from the image.

When controlling the target appliance 100, the control unit 22 stops taking image by the image taking unit 12 temporarily and continuously displays the image of the target appliance 100 taken by the image taking unit 12 in order to present the user the image of the target appliance 100 taken by the image taking unit 12 in a easy-to-recognize manner.

Subsequently, the state of operation of the appliance control apparatus 10 will be described on the basis of a flowchart shown in FIGS. 2 and 3.

Figure 2:
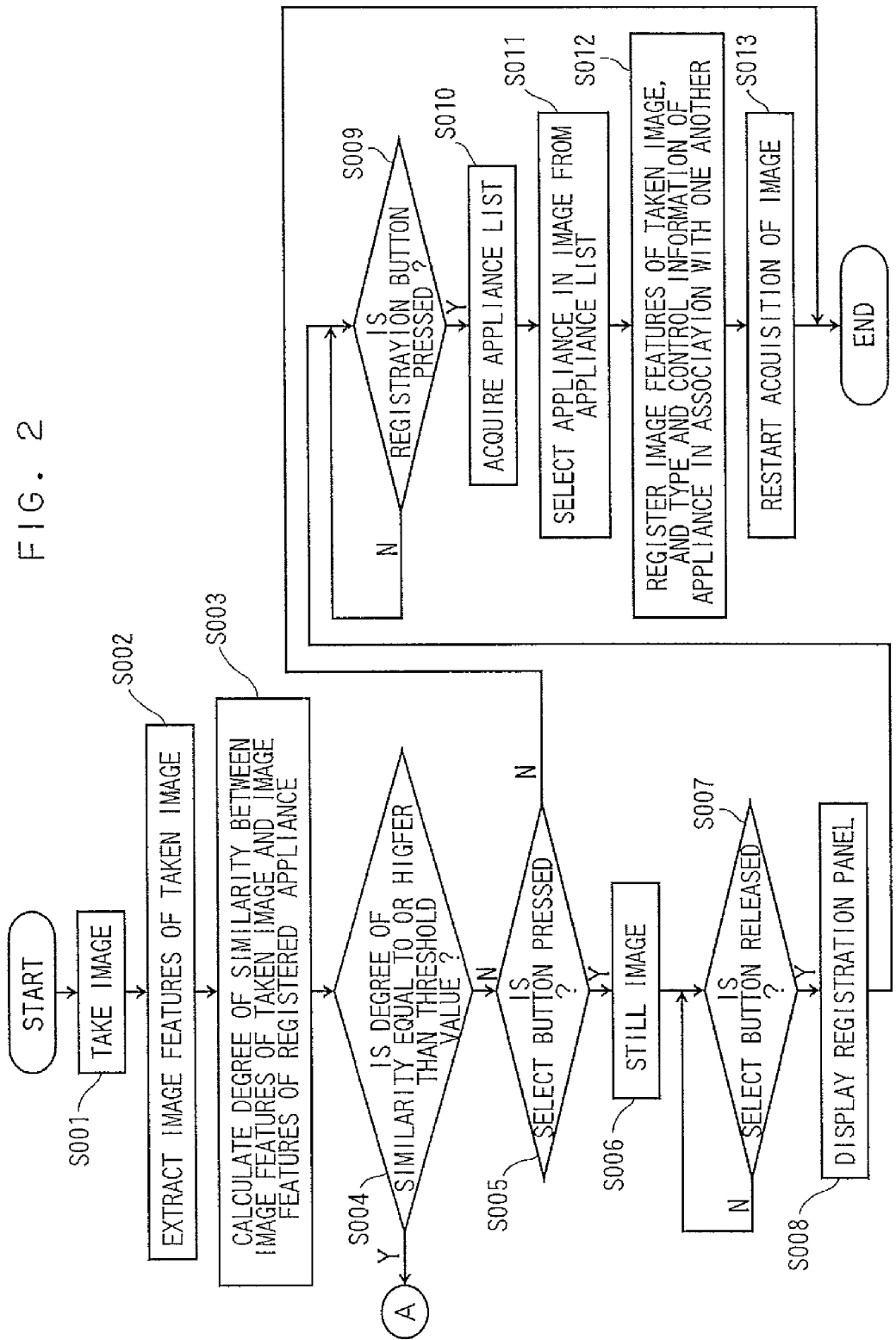
FIG. 2 illustrates a first flowchart of the appliance control apparatus.

As shown in FIG. 2, in Step S001, the user directs the image taking unit 12 of the appliance control apparatus 10 toward an appliance and takes an image of the appliance, then the display unit 16 displays the appliance taken by the image taking unit 12, and the procedure goes to Step S002.

In Step S002, the recognizing unit 18 extracts the image features of the appliance from the image taken by the image taking unit 12, and the procedure goes to Step S003.

In Step S003, the recognizing unit 18 calculates the degree of similarity with respect to the extracted image features of the appliance and the image features of the registered appliance registered in the registering unit 24 in advance, and the procedure goes to Step S004.

In Step S004, the recognizing unit 18 goes to Step S014 when the degree of similarity is equal to or higher than the threshold value (that is, a case where the degree of similarity indicates that the similarity is high) and enters the control mode (If Y, the procedure goes to FIG. 3), and when the degree of similarity is lower than the threshold value (that is, the degree of similarity does not indicate a high similarity), the procedure does to Step S005 and enters the register mode (if N).

In Step S005, since the mode is the register mode, the selecting unit 20 displays the SELECT button 104 on the display unit 16 and, if the SELECT button 104 is pressed by a finger of the user as shown in FIG. 6A, the procedure goes to Step S006 (if Y), and if the SELECT button 104 is not pressed, the process is terminated (if N).

In Step S006, as shown in FIG. 6A, the selecting unit 20 stills the image displayed on the display unit 16, and the procedure goes to Step S007.

In Step S007, if the user pressing the SELECT button 104 with his or her finger releases the finger, the selecting unit 20 goes to Step S008 (if Y), and if the user is continuously pressing the SELECT button 104, the procedure in Step S007 is continued (if N).

In Step S008, the selecting unit 20 displays a confirmation panel 105 as shown in FIG. 6B, then displays the registration panel 106 on the display unit 16 as shown in FIG. 6C, then the procedure goes to Step S009.

In Step S009, if the registration button 107 in the registration panel 106 is pressed, the selecting unit 20 goes to Step S010 (if Y), and if the registration button 107 is not being pressed, the process in Step S009 is continued.

In Step S010, the selecting unit 20 acquires the appliance list, displays the appliance list on the display unit 16 as shown in FIG. 8, and the procedure goes to Step S011.

In Step S011, if the appliance in the image that the user wants to register from the appliance list displayed by the selecting unit 20 is selected, the procedure goes to Step S012.

In Step S012, the selecting unit 20 registers the selected appliance in the registering unit 24 as a registered appliance with the image features of the appliance in the image taken by the image taking unit 12 and the type and the control information of the selected appliance in association with one another, and the procedure goes to Step S013.

In Step S013, the selecting unit 20 restarts taking the image using the image taking unit 12, displays the taken image on the display unit 16, and the register mode is terminated.

As shown in FIG. 3, in Step S014, since the mode is the control mode, the control unit 22 displays the icon 102 on the target appliance 100 displayed on the display unit 16 in an overlapped manner as shown in FIG. 7A, and displays also the SELECT button 104. Then, the procedure goes to Step 015.

In Step S015, if the SELECT button 104 is pressed by the user, the control unit 22 goes to Step S016 (if Y), and if the SELECT button 104 is not pressed, the control mode is terminated (if N).

In Step S016, the control unit 22 stills the image displayed on the display unit 16, and the procedure goes to Step S017.

In Step S017, if the user releases his or her finger from the SELECT button 104, the procedure goes to Step S018 (if Y), and if the user does not release the finger from the SELECT button 104, the procedure in Step S017 is continued.

In Step S018, the control unit 22 specifies the target appliance 100 which is nearest to the center of the age among the appliances to be controlled 100 recognized by the recognizing unit 18, and the procedure goes to Step S019.

Figure 7B:
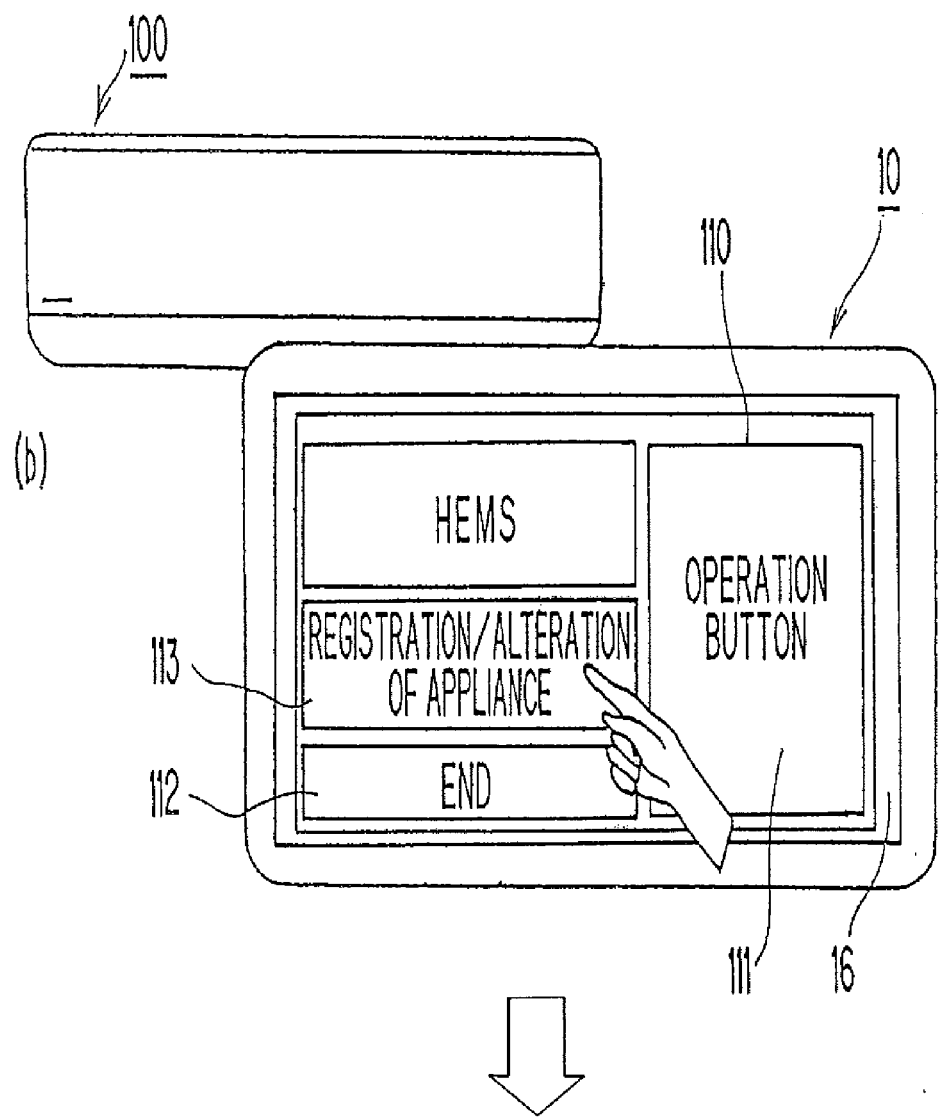
Figure 7C:
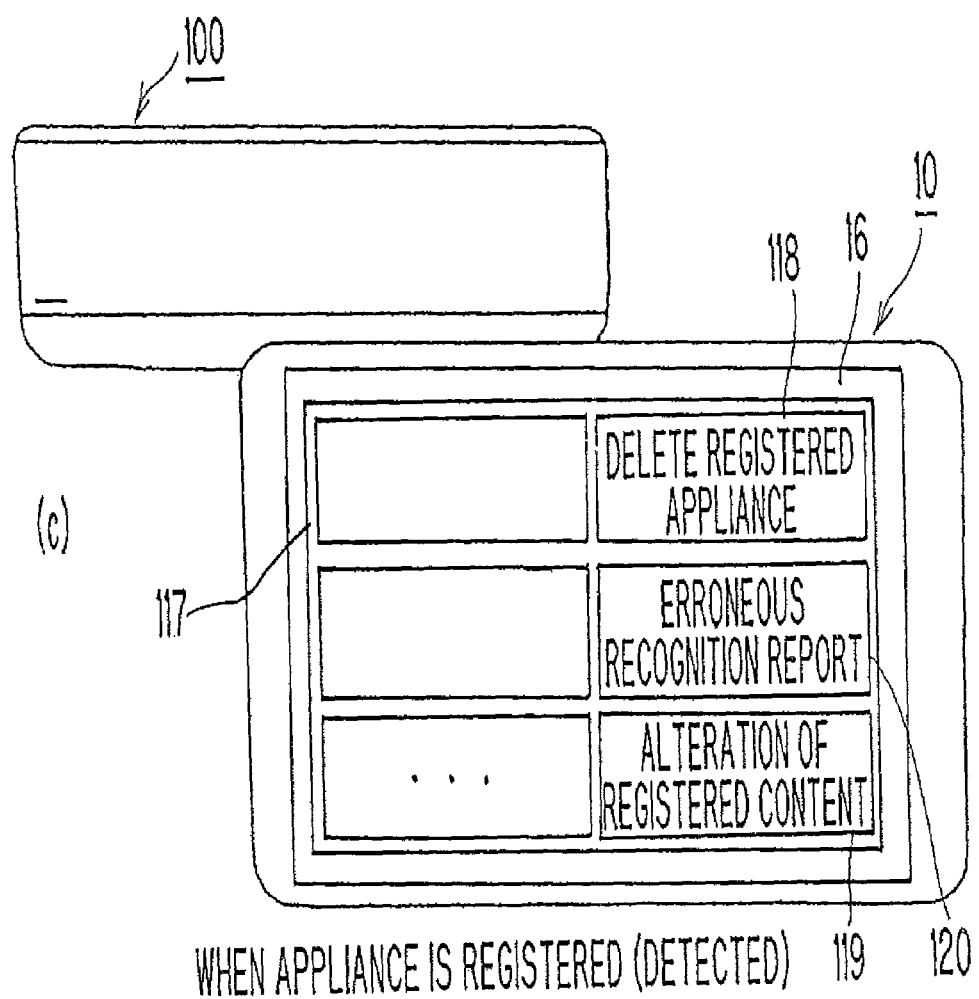

In Step S019, the control unit 22 displays the control panel 110 of the specified target appliance 100 on the display unit 16 as shown in FIG. 7B. In this case, since the registered appliances having the degrees of similarity equal to or higher than the threshold value are registered in the registering unit 24, the type and the control information of the target appliance 100 is called up from the registering unit 24 and the control panel 110 is displayed. Then, the procedure goes to Step S020.

In Step S020, if an OPERATION button 111 of the control panel 110 is pressed by the user, the control unit 22 goes to Step S021 (if Y), and if the OPERATION button 111 is not pressed, the control unit 22 goes to Step S024 (if N).

In Step S021, since the OPERATION BUTTON 111 of the target appliance 100 is pressed, the control unit 22 performs the control in accordance with the control content, and goes to Step S022.

In Step S022, if a QUIT button 112 of the control panel 110 is pressed, the control unit 22 goes to Step S023 (if Y), and if the QUIT button 112 is not pressed, the control unit 22 returns back to Step S021.

In Step S023, the control unit 22 restarts taking the image using the image taking unit 12, displays the taken image on the display unit 16, and the control mode is terminated.

In Step S024, if the QUIT button 112 is pressed, the control unit 22 terminates the operation, and if the QUIT button 112 is not pressed, the control unit 22 returns back to Step S020.

According to Embodiment 1, only by taking the image of the target appliance 100 by the appliance control apparatus 10, the target appliance 100 can be registered and controlled easily, and the burden of the user is alleviated.

Embodiment 2

Referring now to FIGS. 9A-9E and 10, the appliance control apparatus 10 according to Embodiment 2 will be described.

A different point between the appliance control apparatus 10 in Embodiment 2 and the appliance control apparatus 10 in Embodiment 1 is the function of the control unit 22. The control unit 22 in Embodiment 2 is capable of acquiring related information of the target appliance 100 in addition to the control of the target appliance 100 recognized by the recognizing unit 18.

The term "related information" of the target appliance 100 includes an outline of a show going on TV, a detail of a performer, a brand name of clothes on his or her back, a place where a shop introduced on TV is located, or a method of purchasing a product introduced on TV. The related information may be collected from EPG information of the TV or may be collected from a Web screen uploaded on a network.

The state of operation of the appliance control apparatus 10 in Embodiment 2 will be described on the basis of a flowchart shown in FIG. 10.

In the same manner as Embodiment 1, the user passes the appliance control apparatus 10 over the target appliance 100 and takes an image of the target appliance 100 as shown in FIG. 9A. Then, as shown in FIG. 9B, after the appliance control apparatus 10 has recognized the target appliance 100 from the taken image, the appliance control apparatus 10 displays the icon 102 indicating the recognized target appliance 100 on an upper left of the image, and enters the control mode. Since the process from Steps S001 to S023 in this control mode is the same as that in Embodiment 1, the description is omitted.

In Step S124, if the OPERATION button 111 is not pressed and an INFORMATION DISPLAY button 114 in the control panel 110 is pressed, the control unit 22 goes to Step S025 and, if the INFORMATION DISPLAY button 114 is not pressed, goes to Step S028 (see FIG. 9C).

In Step S125, since the INFORMATION DISPLAY button 114 is pressed, the control unit 22 displays an information display menu 115 instead of the control panel 110, and the procedure goes to Step S026 (see FIG. 9D).

In Step S126, if a menu button 116 in the information display menu 115 (for example, "CONCERNED ABOUT CLOTHES button") is pressed, the control unit 22 goes to Step S027, and if the menu button 116 is not pressed, the control unit 22 continues Step S026.

In Step S127, the control unit 22 displays a Web screen (related information) 121 on the display unit 16 relating to the pressed button 116 and terminates the operation (See FIG. 9E).

In Step S128, since neither the OPERATION button 111 nor the INFORMATION DISPLAY button 114 is pressed, the control unit 22 determines whether or not the QUIT button 112 is pressed. If the QUIT button 112 is pressed, the procedure goes to Step S129 and if the QUIT button 112 is not pressed, the procedure returns back to Step S020.

In Step S129, the control unit 22 restarts taking the image using the image taking unit 12, displays the taken image on the display unit 16, and terminates the operation.

According to Embodiment 2, only by taking the image of the target appliance 100 by the appliance control apparatus 10, the target appliance 100 can be registered and controlled easily and, in addition, the related information is easily acquired, so that the burden of the user is alleviated.

Embodiment 3

The appliance control apparatus 10 according to Embodiment 3 will be described.

The recognizing unit 18 of the appliance control apparatus 10 in Embodiment 3 uses information from an acceleration sensor or a gyro sensor integrated in the appliance control apparatus 10 in addition to the calculation of the degree of similarity on the basis of the image features. Accordingly, improvement of recognition accuracy of the target appliance 100 or the registered appliance is achieved.

For example, the recognizing unit 18 compares values of the acceleration sensor or the gyro sensor at the time of registration of the registered appliance in the register mode and values of the acceleration sensor or the gyro sensor at the time of recognition of the target appliance 100 in the control mode. If the sensor similarity of these sensors is equal to or smaller than a threshold value, it is determined that the appliance does not exist in the image irrespective of the degree of similarity obtained from the image features.

The sensor similarity described above is calculated by using the SSD (Sum of Squared Difference), the SAD (Sum of Absolute Difference) or the normalization-cross correlation.

For example, when the appliance control apparatus 10 has a three-axis acceleration sensor, the recognizing unit 18 may calculate the sensor similarity using all the values of the three-axis acceleration sensor, or calculate the degree of similarity only using part of the values.

Also, the recognizing unit 18 may be configured to determine that the appliance exists in the image when a value obtained from weighted summing of the degree of similarity calculated from the image features and the sensor similarity is equal to or larger than a threshold value, and determine that the appliance does not exist in the image when the value is smaller than the threshold value.

Embodiment 4

The appliance control apparatus 10 according to Embodiment 4 will be described.

In this embodiment, consumption of electricity of the appliance control apparatus 10 is suppressed by not taking an image or not performing the recognition process in a state other than that the user operates the appliance control apparatus 10.

For example, the state of operation of the appliance control apparatus 10 can be determined by using the acceleration sensor and the gyro sensor integrated in the appliance control apparatus 10. If the sensor similarity between a value of the sensor when the appliance control apparatus 10 is placed on a floor or a cradle and a value of the sensor at this moment is equal to or higher than a threshold value, the user determines that the appliance control apparatus 10 is not operated and if the sensor similarity is lower than the threshold value, the user may determine that the appliance control apparatus 10 is operated.

When the degree of similarity is calculated from an average of values of the sensor for the past several seconds instead of the value of the sensor at this moment, further stable recognition of the operating state is enabled.

Modification

First of all, Modification 1 of the above-described embodiment will be described.

In the embodiments described above, the recognizing unit 18 may (1) calculate the degree of similarity from the image features of the target appliance 100 and the image features of the registered appliance, and (2) erroneously recognize a registered appliance different from the target appliance 100 even when the degree of similarity is higher than the threshold value.

In this modification, when the registering unit 24 registers the erroneously recognized image features with the registered appliance in association with one another, and calculates a new degree of similarity from the image features of a new target appliance 100 and the image features of the registered appliance, the registering unit 24 does not output the erroneously recognized image features to the recognizing unit 18. Accordingly, the erroneous recognition by the recognizing unit 18 may be reduced. Whether or not the erroneous recognition has occurred is determined by an operation by the user pressing an ERRONEOUS RECOGNITION REPORT button 120 on the registration/alteration panel 117 as shown in FIG. 7C.

Subsequently, Modification 2 of the above-described embodiment will be described. In the above-described embodiments, the appliance that the user wants to register is selected from the appliance list as shown in FIG. 8. Alternatively, however, the type of the appliance may be specified using the beacon or the radio communication.

Subsequently, Modification 3 of the above-described embodiment will be described. In the embodiments described above, the information of the appliance list is stored in the appliance control apparatus 10 in advance. However, the information of the appliance list which is uploaded in the network may be downloaded, or may be acquired by the radio communication with the peripheral appliances.

The appliance control apparatus 10 may be implemented, for example, by using a general-purpose computer as a basic hardware. In other words, the image taking unit 12, the operating unit 14, the display unit 16, the recognizing unit 18, the selecting unit 20, the control unit 22, and the registering unit 24 may be implemented by causing a processor mounted on the computer described above to execute a program. At this time, the appliance control apparatus 10 may be implemented by installing the above-described program on the computer in advance, or may be implemented by storing the program described above in a storage medium such as a CD-ROM or by distributing the program via a network, thereby allowing the user to install the program on the computer as needed. For example, the appliance control apparatus 10 may be a smart phone and the program described above may be delivered from a server to the smart phone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An appliance control apparatus comprising:
a registering unit configured to register, in association with one another, identification information, an image feature, and control information of a registered appliance, which is an appliance to be registered for being controlled;
an image acquiring unit configured to acquire an image in which a target appliance, which is an object of control, is imaged;
a recognizing unit configured to (1) recognize an image feature of the target appliance from the image, (2) calculate a degree of similarity between the image feature of the target appliance and the image feature of the registered appliance, and (3) specify the registered appliance corresponding to the image feature in a case in which the degree of similarity exceeds a threshold similarity as the target appliance; and
a control unit configured to call up the control information of the specified target appliance from the registering unit and control the target appliance,
wherein the registering unit also registers an image feature of a background of the appliance in addition to the image feature of the appliance.

2. The apparatus according to claim 1, wherein the recognizing unit recognizes the image feature of an appliance imaged in the image for registration in a registration mode for registering the registered appliance, and the apparatus further comprises
a selecting unit configured to (1) select identification information of the appliance for registration from an appliance list in which the identification information and the control information of a plurality of the appliances are registered in association with one another, and (2) register the identification information and the control information of the selected appliance and the image feature of the appliance for registration in the registering unit in association with one another as the registered appliance in the registration mode.

3. The apparatus according to claim 2, wherein the selecting unit executes the registration mode when it is determined that the degree of similarity in the recognizing unit does not exceed the threshold similarity.

4. The apparatus according to claim 1, wherein the recognizing unit displays a recognition mark on the recognized target appliance imaged in the image in a superimposed manner.

5. The apparatus according to claim 1, wherein the registering unit deletes part or all of the identification information, the image feature, or the control information of the registered appliance.

6. The apparatus according to claim 1, wherein the registering unit alters part or all of the image feature or the control information of the registered appliance.

7. The apparatus according to claim 1, wherein the registering unit newly adds the image feature and the control information relating to the registered appliance.

8. The apparatus according to claim 1, wherein when the recognizing unit (1) calculates the degree of similarity from the image feature of the target appliance and the image feature of the registered appliance, and (2) erroneously recognizes the registered appliance different from the target appliance even when the degree of similarity exceeds the threshold similarity, the registering unit does not output the erroneously recognized image feature to the recognizing unit when the registering unit (1) registers the erroneously recognized image feature with the registered appliance in association with one another, and (2) calculates a new degree of similarity from the image feature of a new target appliance and the image feature of the registered appliance.

9. A method of controlling an appliance comprising:

registering, in association with one another in a registering unit, identification information, an image feature, and control information of a registered appliance, which is an appliance to be registered for being controlled;

acquiring an image in which a target appliance, which is an object of control, is imaged;

(1) recognizing an image feature of the target appliance from the image, (2) calculating a degree of similarity between the image feature of the target appliance and the image feature of the registered appliance, and (3) specifying the registered appliance corresponding to the image feature in a case in which the degree of similarity exceeds a threshold similarity as the target appliance; and calling up the control information of the specified target appliance from the registering unit and controlling the target appliance, wherein the registering also registers an image feature of a background of the appliance in addition to the image feature of the appliance.

10. An appliance controlling program stored in a computer readable non-transitory medium, the program causing a computer to execute:

registering, in association with one another in a registering unit, identification information, an image feature, and control information of a registered appliance, which is an appliance to be registered for being controlled;

acquiring an image in which a target appliance, which is an object of control, is imaged;

(1) recognizing an image feature of the target appliance from the image, (2) calculating a degree of similarity between the image feature of the target appliance and the image feature of the registered appliance, and (3) specifying the registered appliance corresponding to the image feature in a case in which the degree of similarity exceeds a threshold similarity as the target appliance; and calling up the control information of the specified target appliance from the registering unit and controlling the target appliance, wherein the registering also registers an image feature of a background of the appliance in addition to the image feature of the appliance.

* * * * *